(12) United States Patent
Khelifa

(10) Patent No.: US 6,569,550 B2
(45) Date of Patent: May 27, 2003

(54) VEHICLE COOLING/HEATING CIRCUIT

(75) Inventor: Noureddine Khelifa, Coburg (DE)

(73) Assignee: Valeo Klimasysteme GmbH, Rodach (DE)

( * ) Notice: Subject to any disclaimer, the term of this patent is extended or adjusted under 35 U.S.C. 154(b) by 150 days.

(21) Appl. No.: 09/739,363

(22) Filed: Dec. 19, 2000

(65) Prior Publication Data

US 2001/0045103 A1 Nov. 29, 2001

(30) Foreign Application Priority Data

Dec. 21, 1999 (DE) .......................... 199 61 825

(51) Int. Cl.[7] .......................... H01M 8/00; H01M 8/18; H01M 8/04; H01M 8/12
(52) U.S. Cl. .............................. 429/13; 429/20; 429/26
(58) Field of Search .............................. 429/12, 13, 20 429/22, 26; 123/41, 142

(56) References Cited

U.S. PATENT DOCUMENTS

| | | | |
|---|---|---|---|
| 4,061,187 A | | 12/1977 | Rajasekaran et al. |
| 5,251,588 A | * | 10/1993 | Tsujii et al. .......... 123/142.5 E |
| 5,353,757 A | * | 10/1994 | Susa et al. ................ 123/41.29 |
| 5,537,956 A | * | 7/1996 | Rennfeld et al. ......... 123/41.29 |
| 5,605,770 A | * | 2/1997 | Andreoli et al. ............... 429/20 |
| 5,976,722 A | * | 11/1999 | Muller et al. .................. 429/13 |
| 6,203,935 B1 | * | 3/2001 | Stuhler et al. ................. 429/13 |

FOREIGN PATENT DOCUMENTS

| | | |
|---|---|---|
| DE | 1223196 | 8/1966 |
| DE | 1223196 | 3/1967 |
| DE | 3620288 | 12/1986 |
| DE | 3901124 | 8/1989 |
| DE | 4004936 | 8/1990 |
| DE | 4104093 | 8/1992 |
| DE | 29622811 | 7/1997 |
| EP | 0512307 | 11/1992 |
| EP | 0 638 712 A1 | 2/1995 |
| EP | 0638712 | 2/1995 |
| EP | 0678661 | 10/1995 |
| FR | 2 748 428 | 11/1997 |

OTHER PUBLICATIONS

"10 Jahre TDI–Motor Von Audi." Sonderausgabe MTZ, Eing Sep. 21, 1999, S. 34–37,74, 75.
"Ladeluftkuhlung Mit Niederazeug—Verbrennungsmotoren", By Eitel, MTZ–Motortechnische Zeitschrift 53, 1992, 3, S. 114–121.
"Baureihe 595–Die Neue MTU–Dieselmotoren Generation" By Brucker, et. al. MTU Focus, Feb. 1991, S. 5–11.

* cited by examiner

*Primary Examiner*—Carol Chaney
*Assistant Examiner*—Donald V. Scaltrito
(74) *Attorney, Agent, or Firm*—Liniak, Berenato & White

(57) ABSTRACT

A cooling/heating circuit for a vehicle with at least two constituent circuits, which are at least in part at different temperatures and each contain at least one cooler for cooling at least one assembly in each case, the constituent circuits being coupled fluid-mechanically to one another.

12 Claims, 9 Drawing Sheets

VEHICLE COOLING/HEATING CIRCUIT

FIELD OF THE INVENTION

The present invention relates in general terms to a cooling/heating circuit for a vehicle and especially but not exclusively for a vehicle with an electric motor fed by a fuel cell.

BACKGROUND OF THE INVENTION

In a generally customary manner, a cooling/heating circuit comprises a cooler, which serves to give off heat to the environment. For this purpose, the assembly to be cooled, e.g. the engine or a fuel cell, is brought into thermal interaction with a coolant fluid, whether directly or via a further heat exchanger circuit, the fluid generally being conveyed in the cooling/heating circuit by a pump driven mechanically or by an electric motor. To heat the interior of the motor vehicle, a heat exchanger is conventionally either integrated directly into the cooling/heating circuit or, as in solutions which are already known, a secondary circuit which transfers the heat from the cooling/heating circuit to a heating element is provided for heating purposes. An arrangement of this kind is described, for example, in EP-0 638 712.

However, it has recently been found that, particularly in the case of electric vehicles with a fuel cell that have a high mechanical driving power, the entire heat output to be dissipated can only be removed by a single cooler at considerable expense, if at all. In the case of the above-mentioned vehicles especially, there is a striking difference compared to vehicles driven by internal combustion engines since waste heat can be dissipated to only a minimal extent by means of the exhaust gas, if at all. Another problem results from the fact that not only is the heat output to be dissipated high and the installation space small, but also the temperature level requirements for the individual assemblies to be cooled vary very widely. For example, the operating temperature of a fuel cell is currently about 80° C., while condensers for exhaust gases or a connected air-conditioning system, for example, which are integrated into the cooling/heating circuit, require significantly lower temperatures.

Cooling/heating circuit systems have therefore recently been developed which have two constituent circuits which are, at least in part, at different temperatures and each contain at least one cooler in order in each case to cool at least one assembly. Such a cooling/heating circuit of the generic type in accordance with the preamble of claim 1 is disclosed in "Wärmeübertrager im Brennstoffzellenfahrzeug—neue Anwendungen und Anforderungen" [Heat exchangers in fuel-cell vehicles—new applications and requirements], Brennstoffzellenfahrzeuge, Haus der Technik, Nov. 30, 1999. In the case of the concept disclosed here, a high-temperature coolant circuit is used to cool the fuel cell and the intercooler, if the latter is embodied as a liquid-cooled heat exchanger, while a low-temperature circuit cools the exhaust-gas condenser and other electronic components, where appropriate. Each of the circuits has a separate cooler, the low-temperature cooler being arranged upstream of the high-temperature cooler in terms of airflow. However, since in general the installation space available in vehicles is very limited, there is a problem both with integration and with heat dissipation in a vehicle since separate control and driving means are required for each constituent circuit. As stated by the authors, the solution described is accordingly to be regarded only as a concept proposal, and there is the further proviso that, in general, it would probably only be possible to provide a solution for small-category fuel-cell vehicles.

It is therefore the object of the present invention to specify a cooling/heating circuit which, while requiring less installation space, can also be integrated into vehicles in higher categories, especially those with a high mechanical power.

SUMMARY OF THE INVENTION

According to the invention, the above object is achieved, in the case of a cooling/heating circuit of the generic type with at least two constituent circuits which are, at least in part, at different temperatures and each contain at least one cooler in order in each case to cool at least one assembly, by virtue of the fact that the constituent circuits are coupled fluid-mechanically to one another. In other words, there is an interrelationship at least as regards the flow in the constituent circuits involved, resulting in simplified common control of the respective constituent circuits and/or a fluid drive for the respective constituent circuits that requires less installation space. Any further auxiliary circuits, e.g. a thermodynamic air-conditioning circuit, a conventional and/or thermodynamic heating circuit and the like can optionally be coupled to either of the constituent circuits, although these additional circuits should not be thought of as constituent circuits according to the definition given in the above description and the attached claims.

The constituent circuits are advantageously coupled to one another either by means of a common pump, two pumps with a common drive or by means of a device that, on the basis of the flow in one constituent circuit, brings about flow in another constituent circuit. Although the use of just one pump allows a design that takes up a minimal amount of installation space, a considerable amount of installation space can still be saved if use is made of two pumps with a common drive. In addition to coupling by means of one or more pumps, there is a large number of further ways of using fluid flow in one circuit to bring about fluid flow in another circuit. Purely by way of example, mention will be made here of means based essentially on the principle of an ejector pump, and of a turbine, which, when arranged in one of the constituent circuits, allows mechanical power transmission to a pumping medium in another constituent circuit.

In a preferred embodiment, there is not only coupling in terms of flow but also thermal coupling, thus allowing temperature transfer and, in this context, it is possible, in particular, to use a common line section. The possibility of temperature transfer from one constituent circuit to another, in particular from a constituent circuit at a lower temperature to a constituent circuit at a higher temperature, advantageously makes it possible to compensate for thermal peaks in the constituent circuit at higher temperature or to provide a region at moderate temperature in the latter. It should be mentioned that the thermal coupling can be provided either by mixing fluid or without exchanging fluids, e.g. by means of a heat exchanger.

In order to take account of the respective operating states of the assemblies to be cooled and/or constituent circuits, the coupling in terms of flow and/or the temperature transfer between the constituent circuits can be made controllable. This control can be achieved in a particularly simple manner by means of adjustable valves, although other means, e.g. transmissions with various transmission ratios, are also possible where, for example, two pumps with a common drive are provided.

In a particularly preferred embodiment, the fluid-mechanical and/or temperature coupling takes the form of one constituent circuit acting as a control circuit for the other constituent circuit. If, for example, a low-temperature circuit is provided as a control circuit for a high-temperature circuit, an appropriately arranged metering valve can be used to take fluid from a temperature circuit at high temperature to enable it to be cooled significantly in the low-temperature constituent circuit, so that this lower-temperature fluid can be fed back into the original constituent circuit.

In a particularly preferred embodiment of the present invention, at least one of the assemblies to be cooled comprises a fuel cell, which is associated with one of the constituent circuits via a heat exchanger, for example. Most currently available fuel cells require the use of deionized water, leading to the use at present of an auxiliary circuit with a heat exchanger.

It is furthermore advantageous if at least one of the assemblies to be cooled is an air-conditioning condenser, which is, in particular, arranged at the coolest point in the cooling/heating circuit. It is a well-known fact that air-conditioning condensers require a relatively low temperature level, for which reason air-conditioning systems have generally not been provided in fuel-cell vehicles up to now. However, since high-class vehicles with a correspondingly high engine output are now in demand, it is necessary in terms of vehicle comfort to provide an air-conditioning system for such vehicles.

It is advantageous if at least two, in particular in each case two, assemblies to be cooled from the group comprising the intercooler, the fuel cell or fuel-cell heat exchanger, the exhaust-gas condenser and the fuel cooler, are connected directly in series in a constituent circuit. In particular, it is, for example, advantageous if the intercooler and fuel cells are connected directly in series since, ideally, the air to be fed to the fuel cell should be approximately at the operating temperature of the fuel cell. The same applies to the fuel cooler and it is therefore advantageous to connect it in series with the intercooler and/or the fuel cell.

It is advantageous for at least two, in particular three, assemblies to be cooled which have a low heat output and/or require a low temperature level to be provided in parallel in one of the constituent circuits. In particular, these assemblies can be an intercooler, an air-conditioning condenser, a fuel cooler, an inverter or even the electric motor itself.

Since certain assemblies to be cooled, e.g. the air-conditioning condenser, the exhaust-gas condenser and the intercooler require relatively low temperatures and/or a relatively small cooling capacity, it is preferred that at least one, in particular two, of the above-mentioned assemblies should be connected upstream of the assembly to be cooled with the highest heat output, which will usually be the fuel cell in the case of a fuel-cell vehicle.

To enable the different temperature levels of the constituent circuits coupled in terms of flow, which can optionally also be coupled thermally subject to certain conditions, to be exploited in an optimum manner, it is preferred that at least one, in particular two, assemblies to be cooled which have a low heat output and/or require a relatively low temperature, selected from the group comprising the air-conditioning condenser, the exhaust-gas condenser and the intercooler for example, is/are arranged in a constituent circuit which does not contain the assembly to be cooled with the highest heat output.

Finally it is preferred that the coolers in different constituent circuits should be arranged in separate air ducts. In the case of two constituent circuits, for example, it would be possible to arrange the cooler of the low-temperature constituent circuit in a decentralized manner, i.e. at a different location from that of the conventional cooler in known vehicles.

BRIEF DESCRIPTION OF THE DRAWINGS

Further advantages and features of the invention will emerge from the following description of a number of currently preferred embodiments, which is given with reference to the attached drawings, is provided purely by way of illustration and is not intended to restrict the invention. In the drawings.

DETAILED DESCRIPTION OF THE INVENTION

Figure 1:
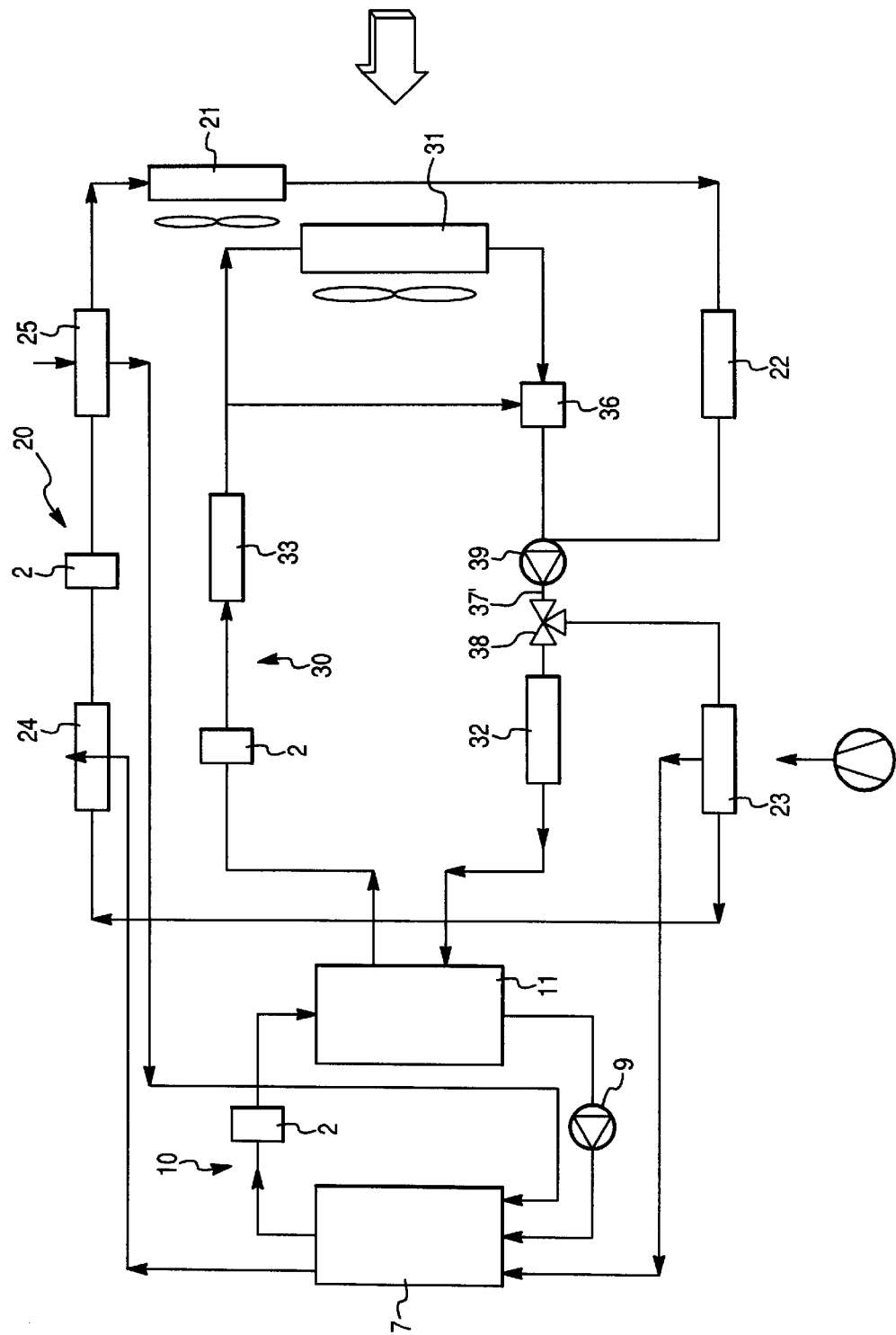
FIG. 1 gives a systematic view of a cooling/heating circuit as a preferred embodiment of the present invention.

FIG. 1 shows the systematic structure of a preferred embodiment of a cooling/heating circuit according to the invention. The cooling/heating circuit shown here is intended for a fuel-cell vehicle and is therefore used primarily to cool a fuel cell 1. Together with a system of lines, a pump 9, an expansion tank 2 and a heat exchanger 11, the fuel cell 1 forms an assembly to be cooled. Fuel cells which are currently available commercially are operated at temperatures between 80° C. and 85° C., the heat output to be dissipated corresponding approximately to the electrical power that can be obtained. In order therefore to cool the assembly 10 including the fuel cell 1, the heat exchanger 11 has connected to it a first constituent circuit 30, which has a cooler 31. The cooler 31 is subjected in the conventional manner to ambient air, a fan being provided in the customary manner to ensure sufficient air exchange. The fluid emerging from the cooler 31 should have a temperature of no more than 75° C., preferably about 60° C. The fluid contained in the first constituent circuit 30, which can be a mixture of water and glycol for example, is moved by a feed pump 39.

In the embodiment illustrated in FIG. 1, the first constituent circuit 30 furthermore contains an expansion tank 2, the electric motor 32 to be cooled, including the inverter associated with it, and a heating heat exchanger 33 by means of which the interior of the vehicle can be heated. Finally, the first constituent circuit 30 also contains a bypass line, which can be controlled by means of a three-way temperature valve 36 to enable the fuel cell 1 to reach the desired operating temperature more quickly during a starting phase of the vehicle.

The cooling/heating circuit illustrated in FIG. 1 furthermore comprises a second constituent circuit 20, which is provided with a decentralized cooler 21, i.e. the cooler 21 does not interact in terms of air flow with the cooler 31 of the first constituent circuit. The condenser 22 of an air-conditioning system (not shown) is connected downstream of the cooler 21. Once the fluid in the second constituent circuit 20, which in the present case is identical with the fluid in the first constituent circuit 20, has passed through the condenser 22, it is fed into the first constituent circuit 30 upstream of the pump 39 in said circuit, the pump 39 thus acting both on the first constituent circuit 30 and on the second constituent circuit 20 on the inlet side. Following the pump 39, the two constituent circuits 20, 30 branch again, a 3-way metering valve 38 being provided in the embodiment illustrated, allowing the fluid to be distributed in a controlled manner between the two constituent circuits. Between the metering valve 38 and the pump 39, the two component streams flow in a common line section 37', with the result that the two constituent circuits are at essentially the same temperature after the metering valve 38, this temperature being in a range between the outlet temperatures of the two coolers 21, 31, preferably less than 60° C.

The fluid in the second constituent circuit 20 then passes through an intercooler 23, which is intended to cool the air used to feed the fuel cell 1, which has first of all been compressed and therefore heated up. The fluid, which has been heated only slightly by the intercooler since the latter generally has a heat output of 5 kW, then passes into an exhaust-gas condenser 24, which is provided for the purpose of cooling the air emerging from the fuel cell 1, allowing the vapor absorbed from the fuel cell to be condensed (for use in steam reforming for the preparation of the fuel for the fuel cell). After passing through the exhaust-gas condenser 24, the fluid reaches an expansion tank 2 and, finally, a fuel cooler 25, before the second constituent circuit 20 returns to the cooler 21. The fuel cooler 25 is provided for the purpose of cooling the fuel coming, for example, from a steam reforming process to the operating temperature of the fuel cell 1.

The concept illustrated in FIG. 1 thus makes it possible to provide the various assemblies to be cooled at the desired temperatures and with the required cooling capacity, using just one pump 39. In particular, it is possible to keep the condenser 22 of the air-conditioning system at temperatures of below 60° C. and to keep the exhaust-gas condenser at temperatures of around or below 60° C. In the description that follows, purely illustrative figures for temperature and power are given for the various assemblies in the individual constituent circuits 20, 30. In the first constituent circuit 30, the temperature on the outlet side of the cooler 31 is about 60° C. The electric motor 32 with its associated inverter provides a heat output of about 20 kW, with the result that the temperature is then below about 70° C. The heat output of the heat exchanger 11 is about 60 kW, giving rise to a temperature of about 80° C. at the outlet. This temperature is sufficient for the heating heat exchanger to heat the interior of the vehicle when required. The cumulative heating power in the first constituent circuit 30 is thus about 80 kW; this heat output can be dissipated by available coolers, thus allowing a standard cooler to be used for the cooler 31.

In the second constituent circuit, the outlet temperature of the cooler 21 is slightly lower, e.g. about 45° C. This temperature makes it possible to dissipate heat from the condenser 22 of the air-conditioning system in a suitable manner. The condenser 22 provides a heat output of about 10 kW, with the result that the temperature of the coolant fed into the first constituent circuit 30 upstream of the pump 39 is below that at the outlet end of the cooler 31. At the 3-way control valve 38, some of the coolant is in turn removed, with the common line section 37' leading to a homogeneous temperature, which is likewise below the outlet temperature of the cooler 31. For example, the temperature in the constituent circuit 20 after the branch can thus be about 55° C. The intercooler 23 provides a heat output of about 5 kW, with the result that the temperature after it is below 60° C., this temperature being well suited to satisfactory cooling of the exhaust-gas condenser. The exhaust-gas condenser provides a heat output of about 20 kW, with the result that the temperature after it is about 70° C. Before the coolant reaches the cooler 21 again, it passes through the fuel cooler 25, which provides a heat output of about 1 kW. The person skilled in the art will recognize that the overall concept accordingly allows improved handling of the heat output to be dissipated, and the amount of space required is minimal, especially since just one pump is required to drive both constituent circuits 20, 30. The 3-way metering valve 38 moreover makes it possible to adjust the overall system to an extremely wide range of operating states of the individual assemblies to be cooled, allowing cooling capacity available in the second constituent circuit 20 to be transferred to the first constituent circuit 30 and vice versa.

Figure 2:
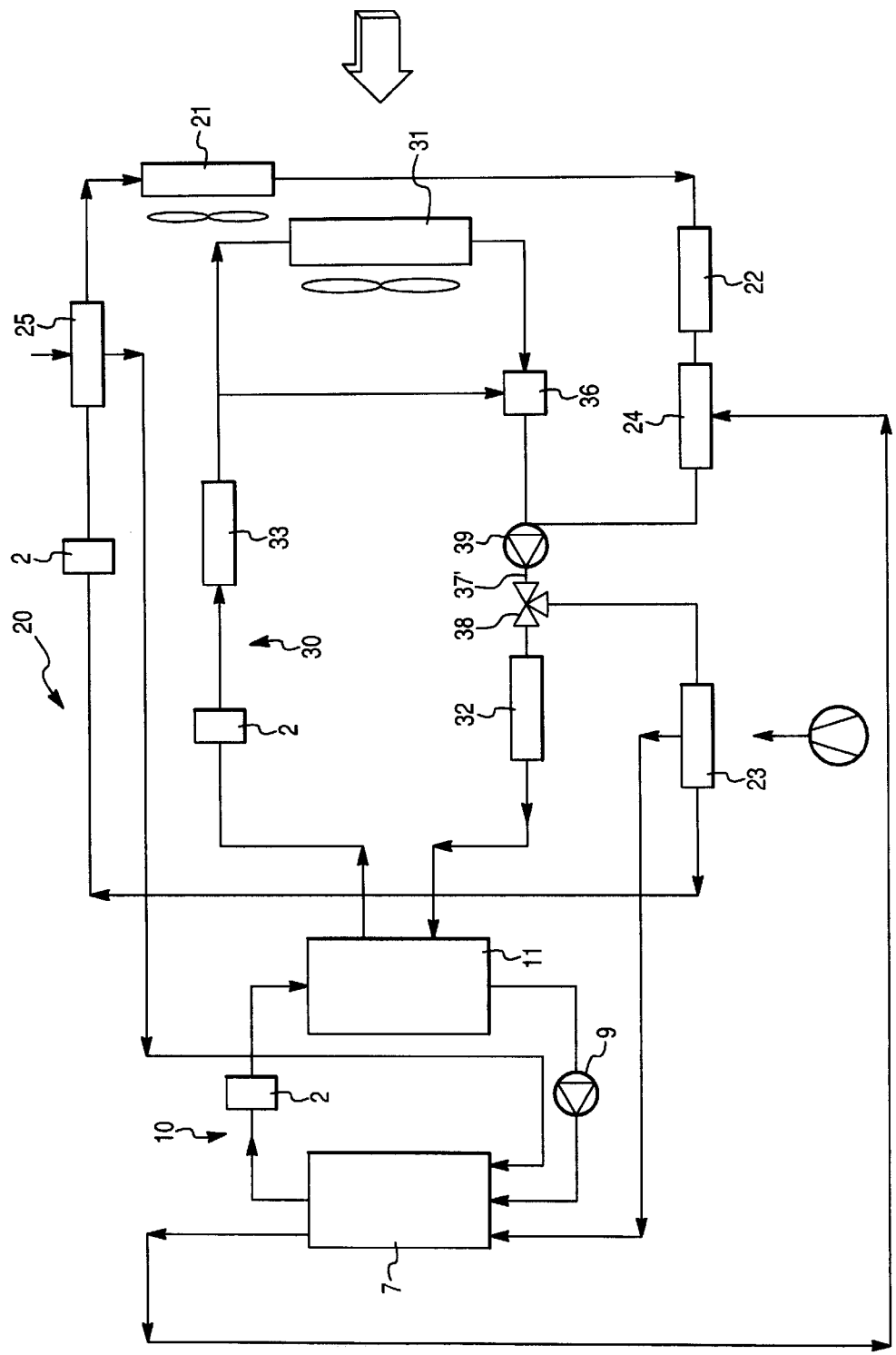
FIG. 2 shows a slightly modified embodiment compared with that in FIG. 1.

FIG. 2 shows a slightly modified embodiment compared with that shown in FIG. 1. The basic structure of the cooling/heating circuit shown in FIG. 2 corresponds essentially to that shown in FIG. 1, and the description of the individual assemblies and components will therefore not be repeated where these correspond, and the same applies to the description of the other figures. In contrast to FIG. 1, the exhaust-gas condenser in the case of the embodiment shown in FIG. 2 is arranged after the condenser 22 for the air-conditioning system. By arranging the exhaust-gas condenser 24 in this subsection of constituent circuit 20, which will always be at a lower temperature than constituent circuit 30, satisfactory condensation of the exhaust gases can be maintained at all times, even if the fuel cell is being operated in the maximum-load range and the temperature of the first constituent circuit 30 is slightly high overall, compared with that described above.

Figure 3:
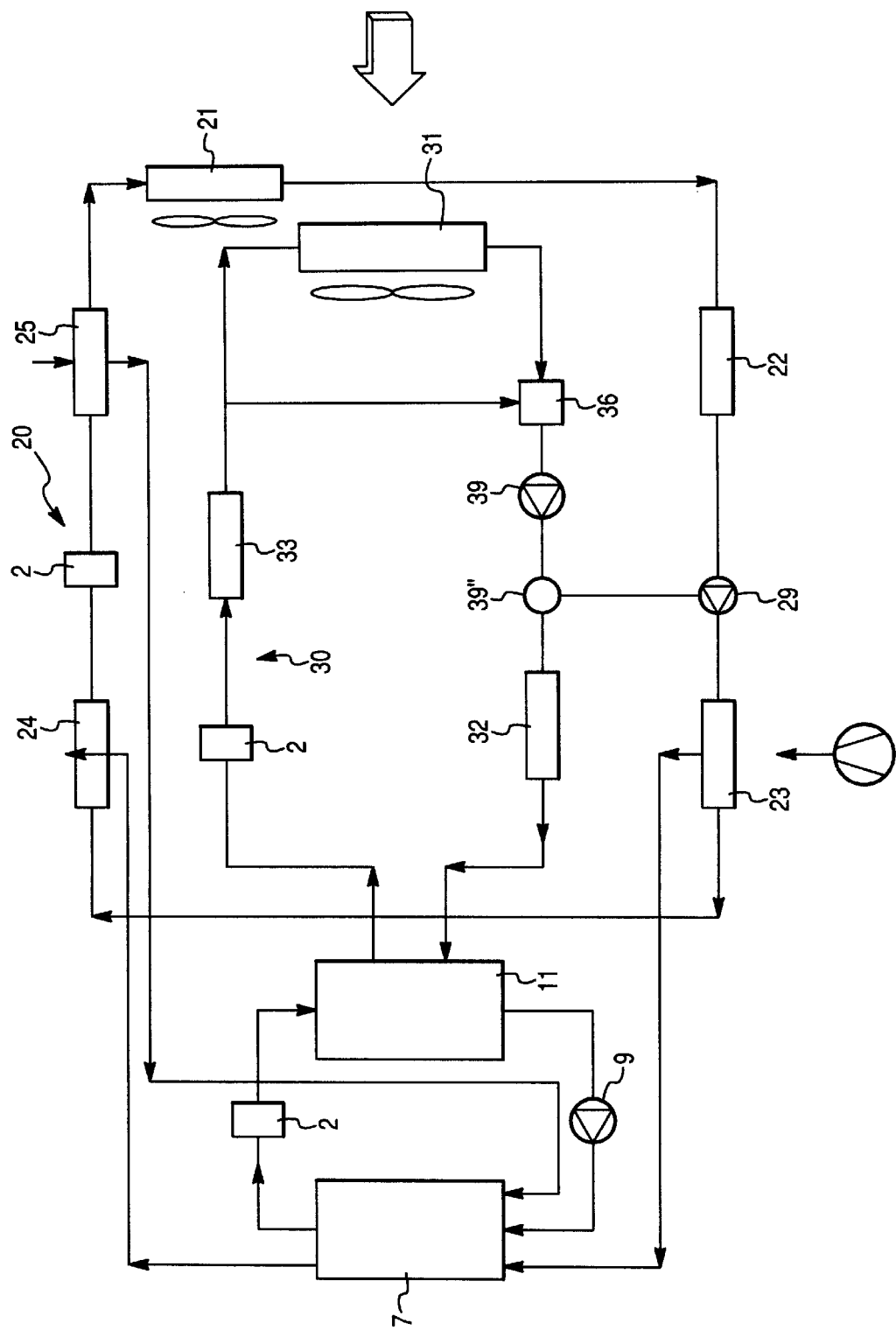
FIG. 3 shows a variant of the embodiment in FIG. 1.

FIG. 3 shows another preferred embodiment of a preferred cooling/heating circuit, a first constituent circuit 30 with corresponding assemblies and a second constituent circuit 20, likewise with corresponding assemblies, being provided as in the two preceding embodiments. In contrast to the preceding embodiments, however, there is no mixing between the fluids in the two constituent circuits, allowing different coolants to be used in the two constituent circuits 20, 30 in this embodiment. According to the invention, however, the two circuits are coupled in terms of flow since a turbine 39" is arranged after the pump 39 in the first constituent circuit 30 and can drive a pumping medium 29 in the second constituent circuit 20 by mechanical power transmission. The person skilled in the art should be aware that a transmission (not shown) can be provided between the turbine 39" and the pumping medium 29 in order to effect controlled coupling in terms of flow. In addition to the possibility of using different fluids, the embodiment illustrated in FIG. 3 also has the advantage that the temperature in the second constituent circuit 20 can be kept at a lower level overall, although this also has the effect that it is not possible for peak outputs in the first constituent circuit 30 to be covered by cooling capacity in the second constituent circuit 20.

Figure 4:
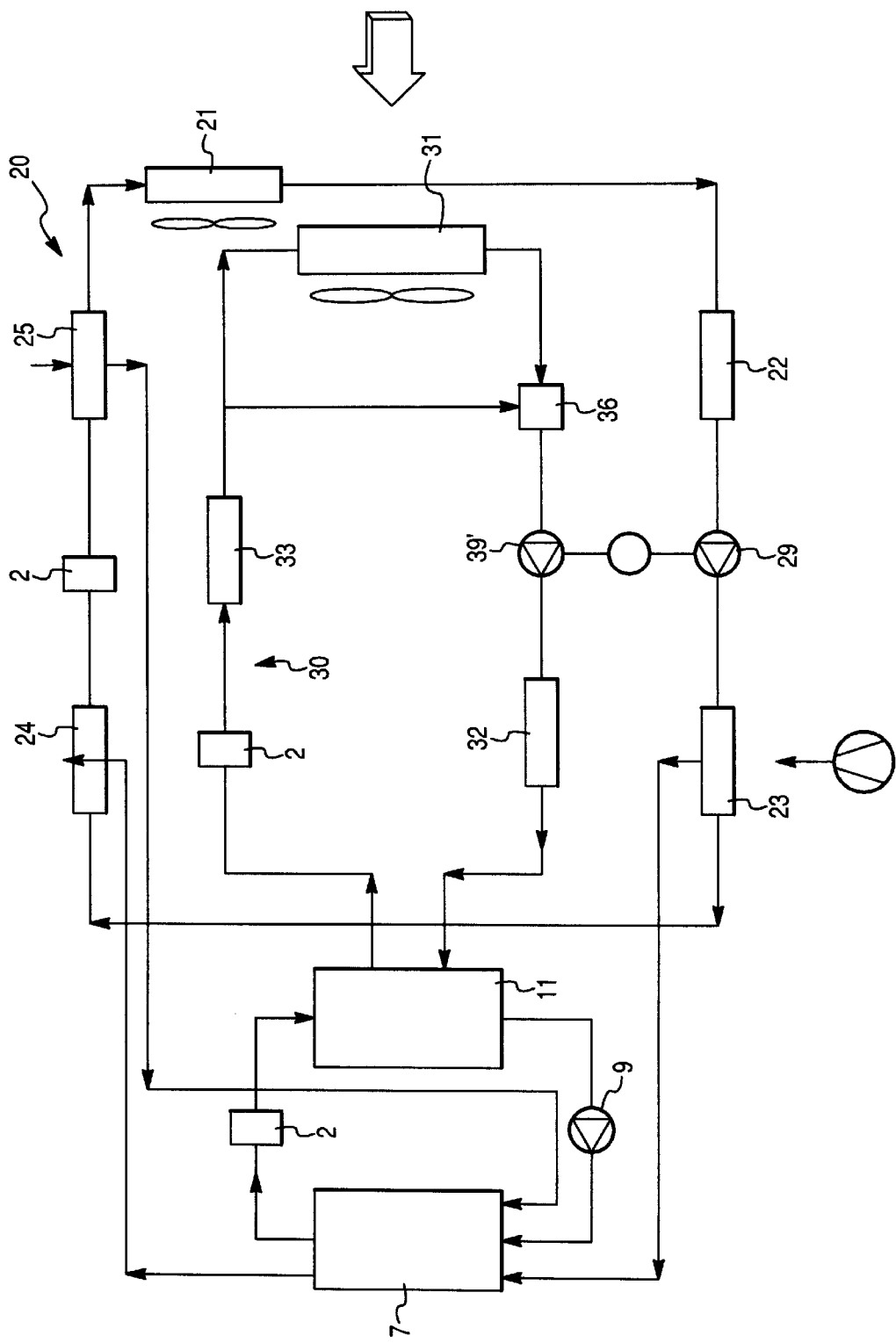
FIG. 4 shows an alternative preferred embodiment of a cooling/heating circuit according to the invention.

In the case of the embodiment illustrated in FIG. 4, the fluid-mechanical coupling is provided by two pumps 29, 39', which can act on the respective fluids by means of a common drive. As also in the case of the embodiment shown in FIG. 3, a transmission can be provided between the drive and at least one or both of the respective pumps to enable the flow velocities in the two constituent circuits to be set in a controllable manner. In this embodiment, the saving of installation space is achieved substantially by means of the common drive for the two pumps 29, 39'. Otherwise, the same advantages in terms of thermodynamics obtain as in the case of the embodiment shown in FIG. 3.

Figure 5:
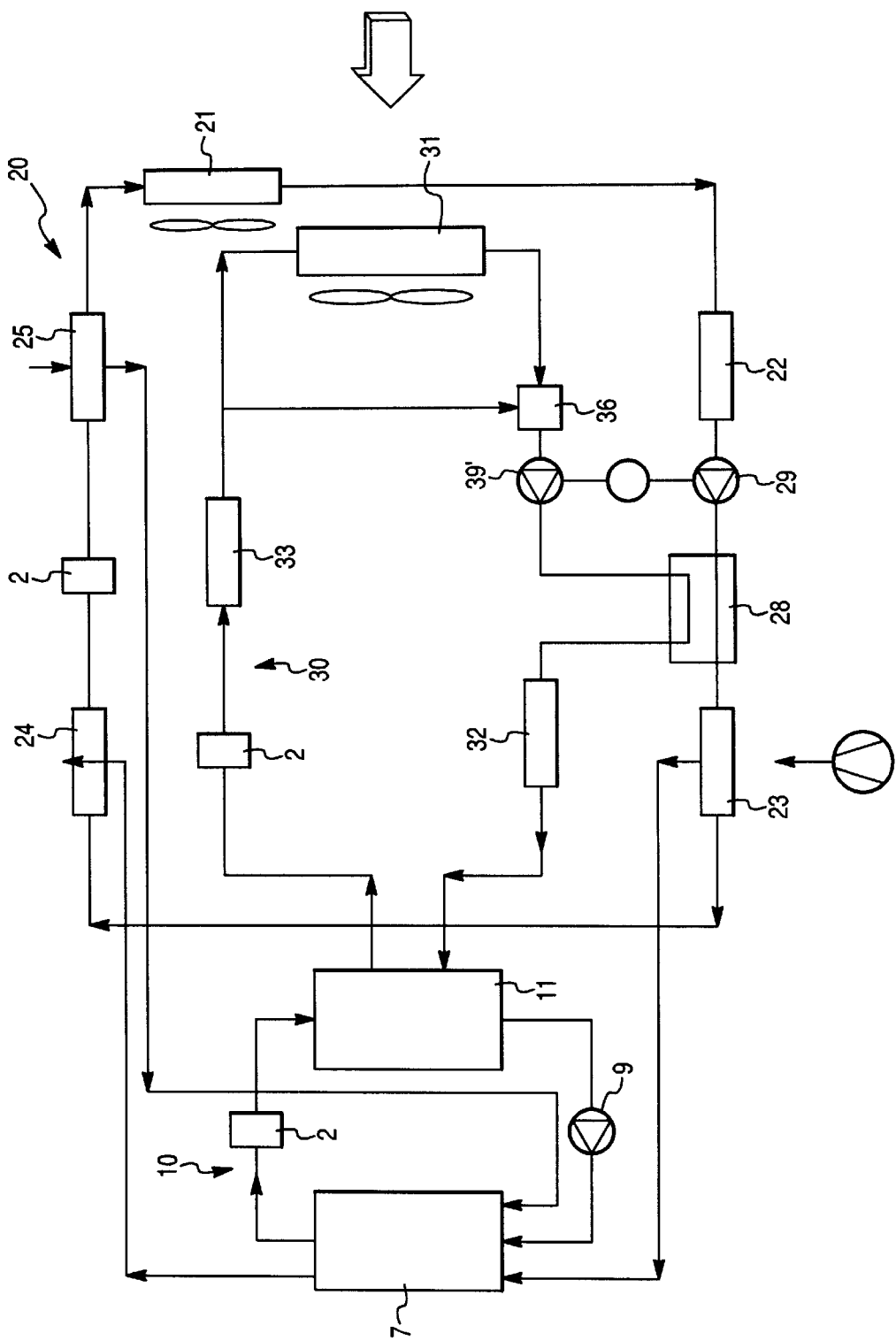
FIG. 5 shows yet another variant of the embodiment in FIGS. 1 to 4.

The embodiment illustrated in FIG. 5 represents a slight modification of the embodiment shown in FIG. 4. In this embodiment, there is not only the fluid-mechanical coupling but also thermal coupling, without mixing of the fluids taking place however. In order to establish the thermal coupling, the two constituent circuits 20, 30 interact by means of a heat exchanger 28. This embodiment thus makes it possible to use different fluids in the constituent circuits although, in contrast to the embodiments shown in FIGS. 3 and 4, thermal peaks in the constituent circuit 30 can be covered by cooling capacity in constituent circuit 20. In order to ensure satisfactory condensation in the exhaust-gas condenser 24, irrespective of operating states, this condenser could, if appropriate, be arranged as in the variant embodiment shown in FIG. 2, i.e. before the thermal interaction between the two constituent circuits 20, 30 occurs.

Figure 6:
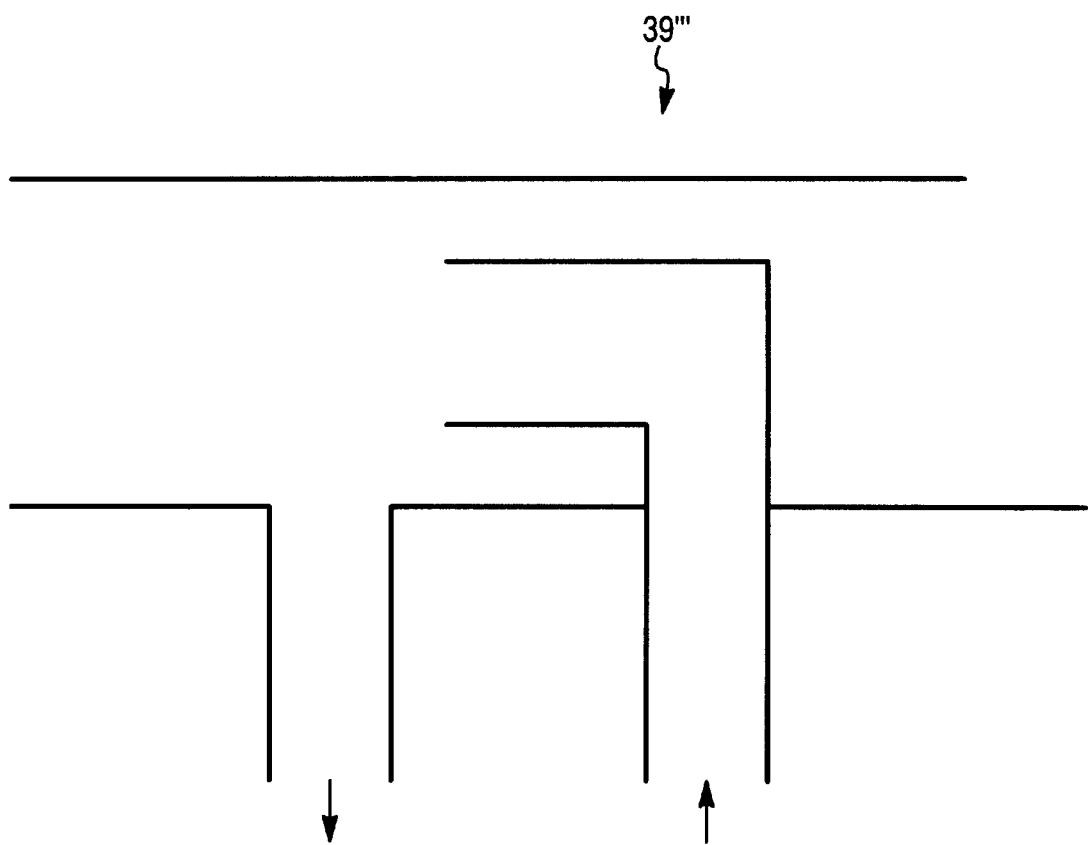
FIG. 6 shows a possible fluid-mechanical coupling between constituent circuits in detail, based on the principle of an ejector pump.

FIG. 6 shows a partial view of another way of coupling the constituent circuits 20, 30 thermally and in terms of flow. The arrangement shown in FIG. 6 is based on the principle of a water ejector pump. In other words, a line section of the second cooling circuit 30 after the pump 39 is fed into the first constituent circuit 30 in such a way that the flow in constituent circuit 30 has a suction effect on constituent circuit 20. In a part of the common line that is further downstream, they can branch off again. In the embodiment shown, this branch is represented simply in the form of an opening in the line but it would also be possible to provide at this point an arrangement similar to the infeed, making it possible to allow for a possible flow profile or temperature profile. If the feed opening and the discharge opening were in alignment, for example, fluid could be fed in at a low temperature and removed at a relatively low temperature.

Figure 7:
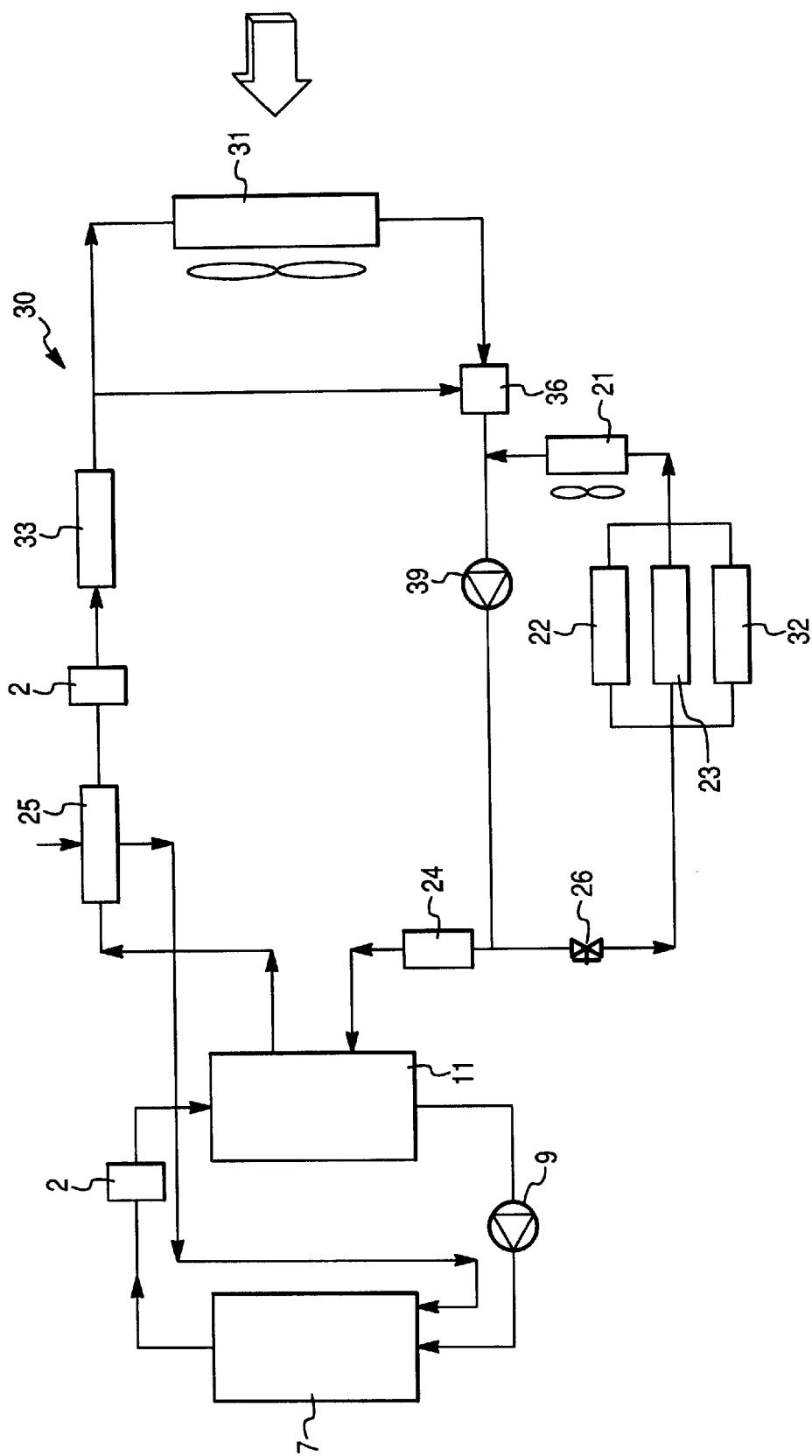
FIG. 7 shows a preferred embodiment of a cooling/heating circuit according to the invention, one constituent circuit being designed as a control circuit for another constituent circuit.

FIG. 7 shows another preferred embodiment of a cooling/heating circuit according to the invention, which differs significantly in concept from the preceding embodiments. In this embodiment too, corresponding components are provided with corresponding reference numerals. The first constituent circuit 30 once again contains a cooler 31 of conventional construction, which can be acted upon by a fan. Arranged downstream of the cooler 30 is an electric pump 39, which delivers the coolant. After the electric pump 39, the coolant passes into an exhaust-gas condenser, in which the exhaust gases from a fuel cell 1, which contain water vapor, are condensed. After the exhaust-gas condenser, the fuel cell 1 is cooled via a heat exchanger 11, after which the flow passes through a fuel cooler 25 and a heating heat exchanger 33. In the embodiment under consideration, the second constituent circuit 20 is designed as a cooling bypass that forms a thermal control circuit. A branch is formed for this purpose downstream of the pump 39. Provided downstream of the branch, in the second constituent circuit 20, is a metering valve 26, enabling the output of the electric pump 39 to be diverted proportionately to the second constituent circuit 20 in a controllable manner. In the embodiment illustrated, the second constituent circuit 20 includes the condenser 22 of an air-conditioning system, the intercooler 23 and the electric motor 32 plus the associated inverter. As illustrated, the above-mentioned assemblies are provided connected in parallel in the second constituent circuit 20. After flowing through said assemblies, the fluid in the second constituent circuit 20 enters a decentralized cooler 21, after which the cooled fluid is fed back into the first constituent circuit 30 upstream of the electric pump 39. Constructing the second constituent circuit 20 as a thermal control circuit enables the inlet temperature for the exhaust-gas condenser 24 to be adjusted in a suitable manner and, as with the preceding embodiments, only one electric pump 39 is required to pump the fluids in both constituent circuits. In the embodiment illustrated here, a low temperature level is thus maintained in the second constituent circuit 20, allowing the condenser 22 of the air-conditioning system to be cooled in a suitable manner, and in particular it is possible to achieve a temperature of about 55° C. on the inlet side of the exhaust-gas condenser. Although the assemblies in the second constituent circuit 20 in the embodiment illustrated in FIG. 7 are shown connected in parallel, partial- or wholly-series connection of these assemblies is also possible.

Figure 8:
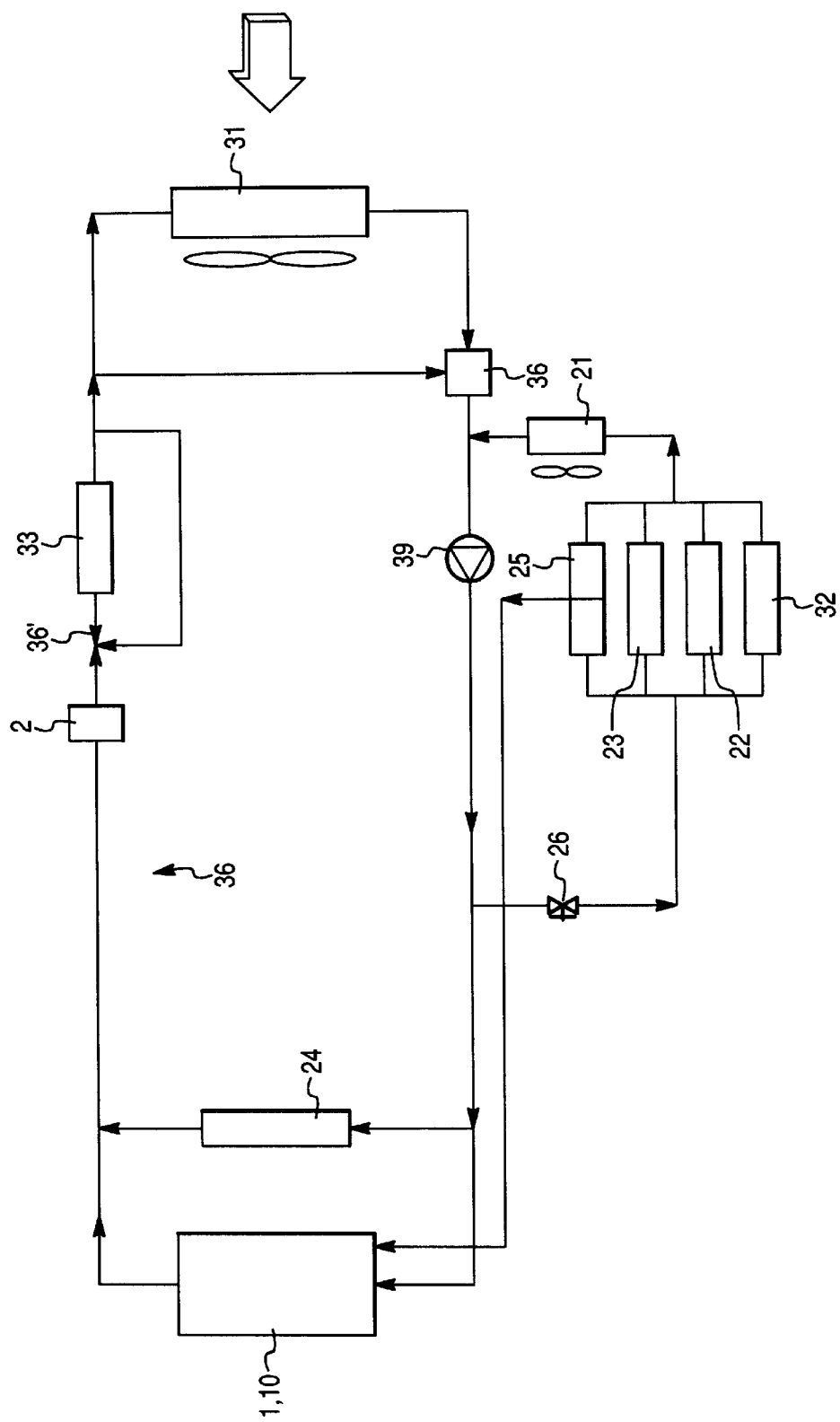
FIG. 8 shows a variant embodiment of that in FIG. 7.

FIG. 8 shows a variant embodiment of the embodiment shown in FIG. 7, a second constituent circuit 20 likewise being assigned as a control circuit to the first constituent circuit 30. In the embodiment illustrated here, the fuel cell 1, as the assembly 10 to be cooled, is cooled directly by the coolant circulating in the first and second constituent circuits 20, 30. As in the case of the preceding embodiments, the first constituent circuit 30 comprises an exhaust-gas condenser 24, which is connected in parallel with the fuel cell in the embodiment illustrated. In the embodiment illustrated, the first constituent circuit 30 contains not only the fuel cell 1 and the exhaust-gas condenser 24 but also a heating-heat exchanger 33, by means of which the interior of the vehicle can be cooled. The heating-heat exchanger 33 is provided with a bypass line which, on the one hand, makes it possible to bypass the heating-heat exchanger when heating of the interior of the vehicle is not required and, on the other hand, allows the coolant to be circulated several times at high temperature through the heating-heat exchanger 33.

Arranged in parallel in the second constituent circuit 20 are the fuel cooler 25, the intercooler 23, the condenser of an air-conditioning system and the electric motor 32 with the associated inverter.

In addition to the advantages obtained according to the embodiment shown in FIG. 7, the embodiment illustrated here is distinguished by the fact that the temperature level for the fuel cell 1 to be cooled and that for the exhaust-gas condenser are essentially the same, making it easier to adjust the temperature, adjustment being possible both by means of the pump 39 and the adjusting valve 26. Moreover, connecting the assemblies to be cooled in parallel in the second constituent circuit 20 likewise makes for simplified control, with the individual assemblies having essentially no thermal effect on one another owing to their connection in parallel.

Figure 9:
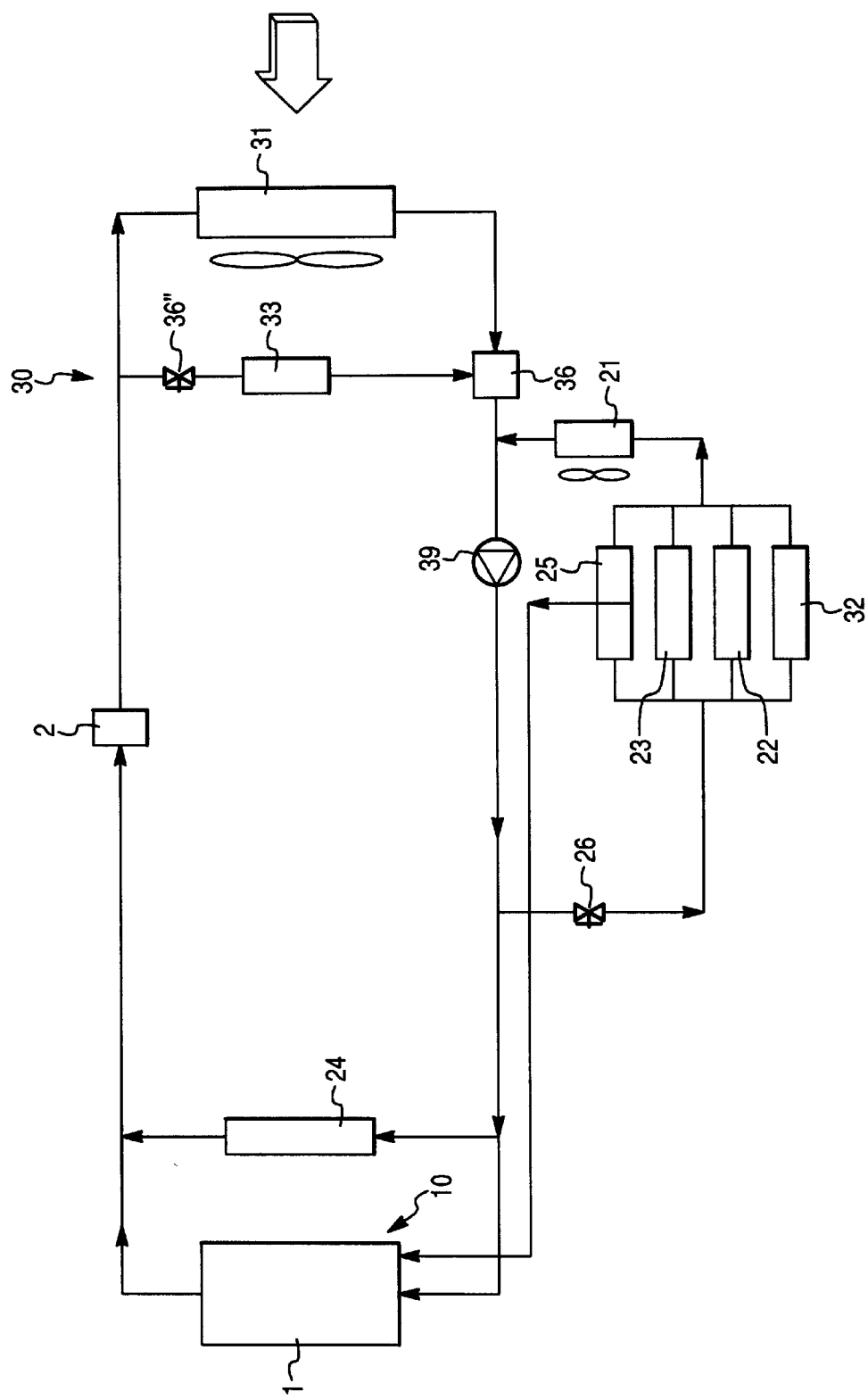
FIG. 9 shows yet another preferred embodiment.

Finally, FIG. 9 shows another variant embodiment of the embodiment shown in FIG. 7, corresponding components being provided with the same reference numerals. For the sake of brevity, components that have already been described will not be described again in detail. The variant embodiment in accordance with FIG. 9 corresponds essentially to the structure shown in FIG. 8 as regards the assemblies to be cooled, but the heating-heat exchanger 33 has been provided in parallel with the cooler 31 in the first constituent circuit 30, a metering valve 36" ensuring adjustable admission thereto. It should be mentioned that a bypass line can also additionally be provided for the heating-heat exchanger 33, in a manner similar to that shown in FIG. 8. It should furthermore be understood that although the adjusting valves 26, 36" are shown as in-line valves, they could also be designed as 3-way valves at the respective line intersections, and it would also be possible to provide further adjusting valves, e.g. at the point where the first constituent circuit 30 branches off toward the fuel cell 1 and the exhaust-gas evaporator 24, allowing the fuel cell to be cooled satisfactorily at the expense of the exhaust-gas condenser, for example, if the fuel cell reaches a critical temperature.

Although the present invention has been described above by way of example and completely with reference to currently preferred embodiments, the person skilled in the art should recognize that a large number of other possible modifications fall within the scope of the claims. In particular, the person skilled in the art should recognize that individual features of one embodiment can be combined in any desired manner with features of other embodiments. Accordingly, it should also be mentioned that although only two constituent circuits have been described above, any number of constituent circuits is possible as long as there is fluid-mechanical coupling between at least two constituent circuits as specified by the invention. Finally, it should be mentioned that the principle in accordance with the invention can also be applied to other assemblies to be cooled.

In summary, it may at any rate be stated that the solution according to the invention allows significantly improved cooling of an extremely wide range of assemblies at different temperatures and/or with different heat outputs without excessively increasing the required installation space or the number of components required.

What is claimed is:

1. A cooling/heating circuit for a vehicle with at least two constituent circuits, said at least two constituent circuits being at least in part at different temperatures and each containing at least one cooler in order on each case to cool at least one assembly, wherein the constituent circuits are coupled fluid-mechanically to one another, wherein at least one of said assemblies to be cooled is/are connected upstream of the one of said assemblies to be cooled that has the highest heat output.

2. A cooling/heating circuit according to claim 1, wherein the constituent circuits are coupled to one another either by a common pump, two pumps with a common drive or by a device which, on the basis of flow in one constituent circuit, brings about flow in another constituent circuit.

3. A cooling/heating circuit according to claim 1, wherein the constituent circuits have temperature transfer means that allow a temperature transfer through a common line section.

4. A cooling/heating circuit according to claim 3, wherein the coupling and/or temperature transfer between constituent circuits can be controlled.

5. A cooling/heating circuit according to claim 1, wherein one constituent circuit is assigned as a control circuit to another constituent circuit.

6. The cooling/heating circuit according to claim 1, wherein at least one of the assemblies to be cooled includes a fuel cell with a heat exchanger interposed for association with one of the constituent circuits.

7. The cooling/heating circuit according to claim 1, wherein at least one of the assemblies to be cooled is a condenser of an air-conditioning system, said condenser is arranged at a coolest point in the cooling/heating circuit.

8. The cooling/heating circuit according to claim 1, wherein at least two of the assemblies to be cooled include any two from the group including an intercooler, a fuel cell (heat exchanger), an exhaust-gas condenser and a fuel cooler, and are connected directly in series in one of said constituent circuits.

9. The cooling/heating circuit according to claim 1, wherein at least two of the assemblies to be cooled include any two from the group including an intercooler, an air-conditioning condenser, a fuel cooler, an inverter and an electric motor, and are connected in parallel in one of said constituent circuits.

10. The cooling/heating circuit according to claim 1, wherein at least one of said assemblies to be cooled includes at least one from the group including an air-conditioning condenser, an exhaust-gas condenser and an intercooler.

11. A heating/air-conditioning system including a cooling/heating circuit according to claim 1, wherein at least one of the assemblies to be cooled includes anyone from the group including an air-conditioning condenser, an exhaust-gas condenser and an intercooler, and is/are arranged in one of said constituent circuits that does not contain said assembly to be cooled having the highest heat output.

12. A cooling/heating circuit according to claim 1, wherein the coolers are arranged in separate air ducts.

* * * * *